(12) United States Patent
Sesek et al.

(10) Patent No.: US 7,698,389 B2
(45) Date of Patent: Apr. 13, 2010

(54) DEVICE CONFIGURATION IN A DISTRIBUTED ENVIRONMENT

(75) Inventors: Robert Sesek, Boise, ID (US); Christian L. Struble, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2556 days.

(21) Appl. No.: 09/859,856

(22) Filed: May 16, 2001

(65) Prior Publication Data

US 2002/0174209 A1 Nov. 21, 2002

(51) Int. Cl.
*G06F 15/177* (2006.01)

(52) U.S. Cl. .................. 709/220; 709/221; 709/208; 709/223

(58) Field of Classification Search .......... 709/212, 709/220–225, 208
See application file for complete search history.

(56) References Cited

U.S. PATENT DOCUMENTS

| | | | | |
|---|---|---|---|---|
| 5,822,531 A * | 10/1998 | Gorczyca et al. | ............. | 709/221 |
| 5,878,232 A * | 3/1999 | Marimuthu | ................. | 709/249 |
| 6,092,078 A * | 7/2000 | Adolfsson | ................... | 707/102 |
| 6,112,256 A * | 8/2000 | Goffinet et al. | ................ | 710/8 |
| 6,170,007 B1 | 1/2001 | Venkatraman et al. | ...... | 709/218 |
| 6,195,694 B1 * | 2/2001 | Chen et al. | .................. | 709/220 |
| 6,195,706 B1 * | 2/2001 | Scott | ........................... | 709/245 |
| 6,247,052 B1 * | 6/2001 | Huang et al. | ................. | 709/224 |
| 6,308,205 B1 * | 10/2001 | Carcerano et al. | ........... | 709/221 |
| 6,385,668 B1 * | 5/2002 | Gaddess et al. | ................ | 710/8 |
| 6,421,719 B1 * | 7/2002 | Lewis et al. | ................. | 709/224 |
| 6,535,491 B2 * | 3/2003 | Gai et al. | ..................... | 370/256 |
| 6,542,929 B1 * | 4/2003 | Briskey et al. | ............. | 709/223 |
| 6,701,364 B1 * | 3/2004 | Meyer | ......................... | 709/224 |
| 6,748,429 B1 * | 6/2004 | Talluri et al. | ................ | 709/221 |
| 6,874,021 B1 * | 3/2005 | Liu et al. | .................... | 709/223 |

OTHER PUBLICATIONS

J.-L. Gailly & m. Adler; HP Web JetAdmin-Reference Manual; Hewlett-Packard Company; 1996-2001; pp. 1-36.
UPnP Device Architecture; v. 1.0, Jun. 8, 2000; Contr. Members of the UPnP Forum; pp. 1-43.
G. Zioulas et al; The BaBar Online Databases; 2000; pp. 1-4.
DE OA for Appln. DE10218536.0.

* cited by examiner

*Primary Examiner*—Ramsey Refai
(74) *Attorney, Agent, or Firm*—Jack H. McKinney

(57) ABSTRACT

A method for configuring devices on a computer network. Configuration involves initiating a configuration session on a primary device causing the primary device to collect configuration session on a primary device causing the primary device to collect configuration logic for the primary device and one or more secondary devices. The primary device then generates a user interface having user accessible controls for selecting and returning configuration settings for the primary and secondary devices. Each selected configuration setting is then returned and applied to the primary or secondary device for which it is selected.

33 Claims, 8 Drawing Sheets

DEVICE CONFIGURATION IN A DISTRIBUTED ENVIRONMENT

FIELD OF THE INVENTION

The present invention is directed to network device configuration. More particularly, the invention is directed to device configuration in a distributed environment.

BACKGROUND OF THE INVENTION

Generally speaking, a computer network is made up of a number of interconnected devices such as desktop computers, servers, and peripherals including printers, copiers, scanners, fax machines, multifunction devices, and electronic storage devices. Each device has a number of settings to be configured from time to time. These settings include IP (Internet Protocol) addresses; subnet masks; IP gateway addresses; proxy server assignments; community names; device passwords; location descriptions; system contact; frame type selections; protocol stack selections; print resolution; duplexing; and paper tray selection just to name a few. A single setting for certain attributes, such as the IP gateway and subnet mask, may be applied across multiple devices. For devices such as printers, different settings for paper tray output and print resolution are applied to each device individually.

In the past, configuration required physically accessing each device and entering the desired settings though a control panel or other interface provided by the device. As the number of devices on the network increases, so does the difficulty in managing the configuration of the devices. This is especially true as the geography of the network expands. In today's businesses, it is not uncommon for a network to expand across buildings, across states, or even across countries—making physical access to many devices difficult if not impossible. Consequently, methods and systems have evolved for remotely accessing and configuring network devices.

One solution involves embedding a web server in each device for managing the configuration of that device. Using a conventional web browser, a system administrator can browse to the address of a particular device. The embedded web server returns a web page allowing the administrator to select configuration settings for that device. While this allows remote configuration, it requires the administrator to manually browse to and configure each device one at a time.

A second solution involves placing network devices under the control of a device management software application such as Hewlett-Packard's Web JetAdmin™. The software is usually installed on a network server or workstation. Using a conventional browser, a system administrator can browse to the device management application which in turn communicates with network devices allowing the administrator to select the configuration settings to be applied to a device individually or to a group of devices simultaneously. As new devices become available, the device administration software must be updated to provide configuration support for each new device.

What is needed is a system for simultaneously configuring a group of network devices that does not require the installation and maintenance of a software application as new devices become available on the network.

SUMMARY OF THE INVENTION

Accordingly, the present invention is directed to configuring devices on a computer network. Configuration involves initiating a configuration session on a primary device causing the primary device to collect configuration logic for the primary device and one or more secondary devices. The primary device then generates a user interface having user accessible controls for selecting and returning configuration settings for the primary and secondary devices. Each selected configuration setting is then returned and applied to the primary or secondary device for which it was selected.

DETAILED DESCRIPTION OF THE INVENTION

Figure 1:
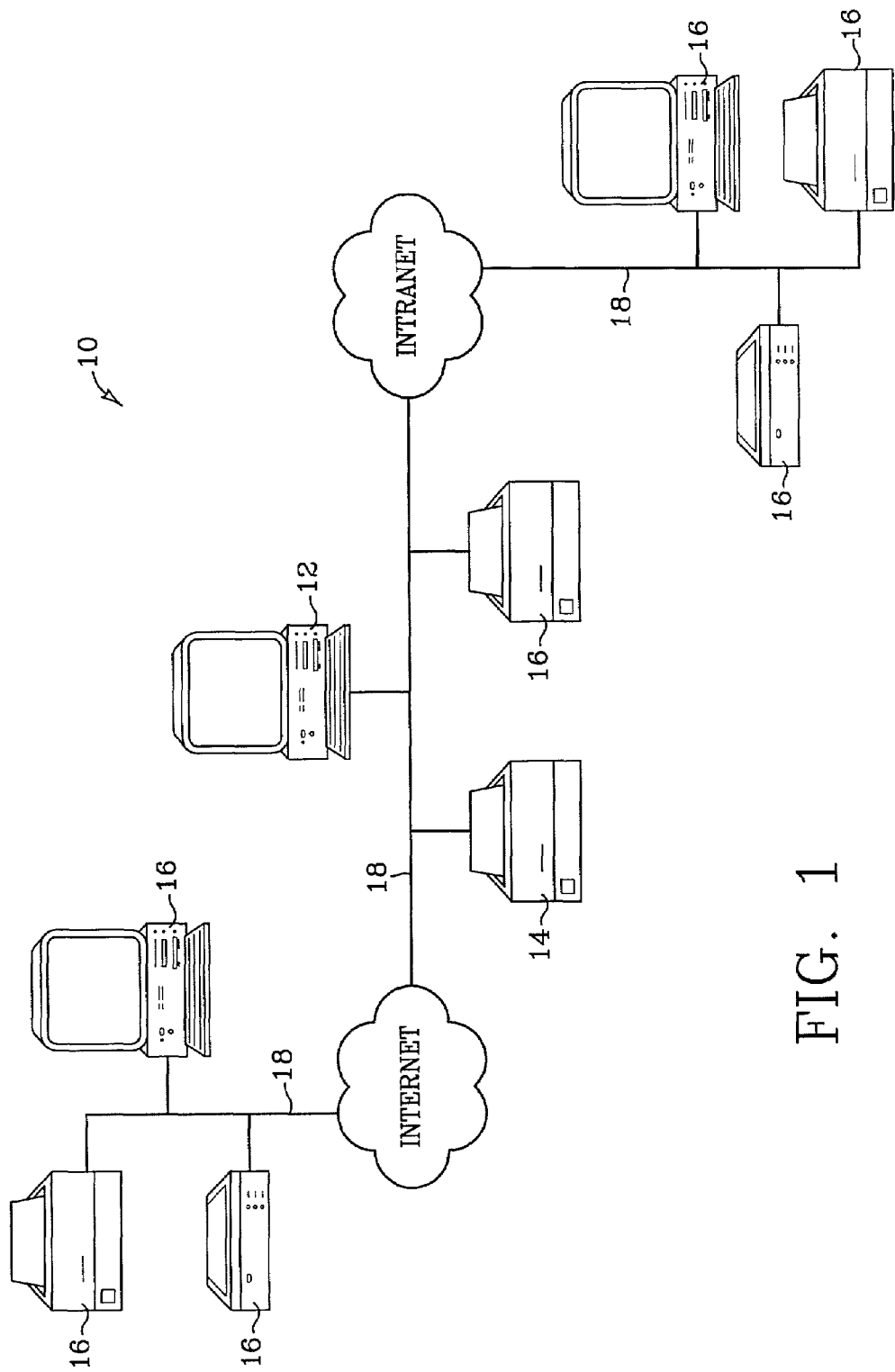
FIG. 1 is a schematic representation of a computer network that includes a client device, a primary device, and several secondary devices illustrating one system in which the invention may be implemented.

GLOSSARY: The following terms are used throughout the detailed description.

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction in a distributed system in which a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for delivering requested information back to the client. In any given network there may be multiple clients and multiple servers. A single device may contain programming allowing it to operate both as a client device and as a server device.

User Interface: The junction between a user and a computer program providing sets of commands or menus through which a user communicates with a program. For example, in the client-server model defined above, the client device generally displays the user interface for communicating with programs operating on a server device. A user interface presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Configuration logic: The information used to generate a user interface for configuring a network device. This information can include data on the controls to be displayed; ranges of acceptable values for a particular configuration setting; a default value for a configuration setting; and any other information relating to the configuration of a network device.

INTRODUCTION: In a computer network environment, a system administrator or other user is faced from time to time with the task of configuring any number of devices connected to the network. A network device can be any machine or component in any manner connected to a computer network. These devices can include computer work-stations including desktop and laptop computers, personal data assistants or other palm top computers, servers, peripherals such as electronic storage devices, printers, copiers, facsimile machines, scanners, as well as finishing device such as binders and collators. As homes and offices become more automated, these devices can even include appliances such as a microwave, a refrigerator, an alarm system, or any other network connected tool.

It is expected that the embodiments of the invention described below will ease the task of network device configuration by:

(1) providing each network device with a server enabling remote management of its own configuration; and (2) providing at least one network device with an enhanced server enabling that device to collect configuration logic from the other network devices and to then generate a common user interface for configuring each of the devices.

Throughout the description below, the enhanced network device will be referred to as a primary device while the other devices will be referred to as secondary devices. It should be noted that more than one primary network device can operate on a given network.

Although the various embodiments of the invention disclosed herein will be described with reference to the computer network 10 shown schematically in FIG. 1, the invention is not limited to use with network 10. The invention may be implemented in or used with any computer system in which it is necessary or desirable to configure multiple network devices. The following description and the drawings illustrate only a few exemplary embodiments of the invention. Other embodiments, forms, and details may be made without departing from the spirit and scope of the invention, which is expressed in the claims that follow this description.

Referring to FIG. 1, network 10 represents generally any local or wide area network in which a variety of different electronic devices are linked. Network 10 includes client device 12, typically a personal computer workstation. However, client device 12 can include any device capable of providing a user interface. Network 10 also includes primary device 14 and secondary devices 16. While represented as printers, scanners, and computer workstations in FIG. 1, devices 14 and 16 represent any configurable device present on network 10.

Communication link 18 interconnects client device 12 and network devices 14 and 16. Communication link 18 represents generally a cable, wireless, or remote connection via a telecommunication link, an infrared link, a radio frequency link, or any other connector or system that provides electronic communication between devices 12, 14, and 16. Communication link 18 may represent an intranet, the Internet, or a combination of both. The path followed by link 18 between devices 12, 14, and 16 in the schematic view of FIG. 1 represents the logical communication path between these devices, not necessarily the physical path between the devices. Devices 12, 14, and 16 can be connected to the network at any point and the appropriate communication path established logically between the devices.

Figure 2:
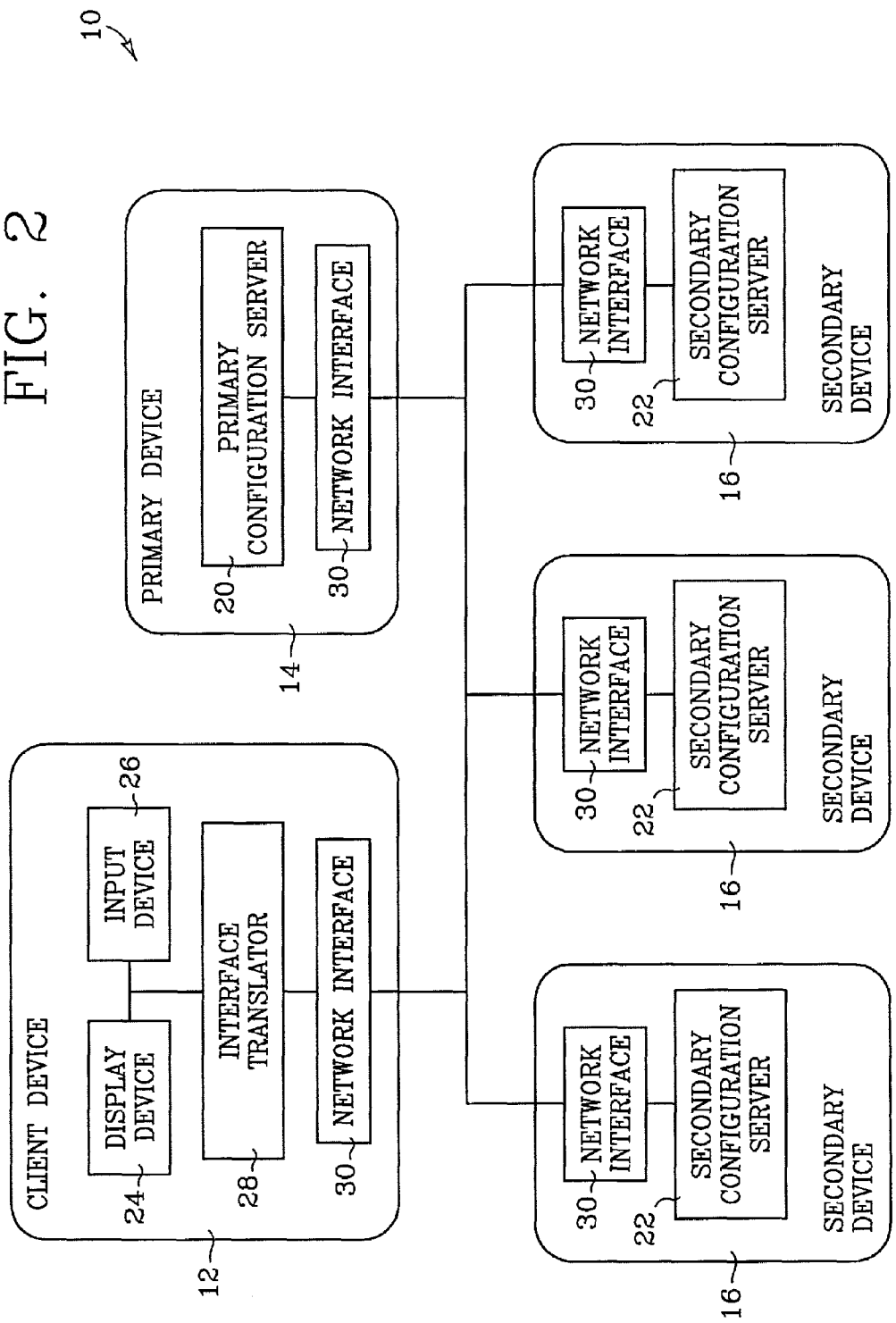
FIG. 2 is a block diagram of the network of FIG. 1 in which the invented device configuration process is embodied in software running on the primary and secondary network devices according to one embodiment of the present invention.

COMPONENTS: The logical components of one embodiment of the invented device configuration system will now be described with reference to the block diagrams of FIGS. 2-4. In FIG. 2, the invention is embodied in primary configuration server 20 operating on or otherwise communicating with primary device 14. Described in more detail below, primary configuration server is a program enabling remote configuration of primary device 14 and for facilitating network communication for the remote configuration of secondary devices 16. Secondary configuration servers 22, each operating on or otherwise communicating with a secondary device 16, are programs enabling remote configuration of secondary devices 16. Client device 12 provides a user interface for configuring primary and secondary devices 14 and 16. Client device 12 generally includes a monitor or other suitable display device 24 and a keyboard and/or a pointing device such as a mouse or other suitable input device 26. Client 28 is a program for causing display device 24 to display a desired user interface and for delivering instructions to primary configuration server 20. Consequently, while client device 12 is illustrated as a device separate from primary and secondary devices 14 and 16, the function of client device 12 can be incorporated into any network device capable of providing a user interface which may include primary and secondary devices 14 and 16. To facilitate network communication between devices 12, 14, and 16, each includes network interface 30.

Figure 3:
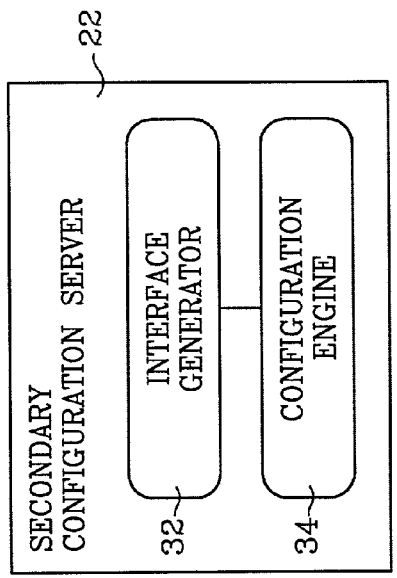
FIG. 3 is a block diagram further illustrating the logical components of a secondary configuration server of FIG. 2.

Illustrated in FIG. 3, the logical components of secondary configuration server 22 include secondary interface generator 32 and secondary configuration engine 34. Secondary interface generator 32 is responsible for generating or making available configuration logic for its corresponding secondary device 16. Secondary configuration engine 34 is responsible for configuring secondary device 16. It is envisioned that secondary configuration servers 22 will be web servers, in this case secondary web servers, embedded in or otherwise operating on secondary devices 16. Each secondary device will have a web page generated using the configuration logic for that device. Each secondary device will also have a unique network identifier such as an IP (Internet Protocol) address allowing a web browser to access the web page for that device and to return selected configuration settings.

While providing additional functions described below, it is also envisioned that primary configuration server 20 will be a web server, in this case a primary web server, embedded in or otherwise operating on primary device 14. Primary device 14 will also have a web page generated using the configuration logic for the primary device. The web page will be associated with a unique network identifier allowing a web browser to access the web page for primary device 14 and return selected configuration settings. The term web server includes any program that delivers documents, commonly referred to as web pages, over a network such as the World Wide Web. Web pages can be delivered in a number of formats including, but not limited to, HTML (Hyper-Text Markup Language), ASP (Active Server Pages), and JSP (Java Server Pages). U.S. Pat. No. 6,170,007 issued to Chandrasekar Venkatraman on Jan. 2, 2001, teaches the use of embedded web servers in network devices and is hereby incorporated by reference.

Figure 4:
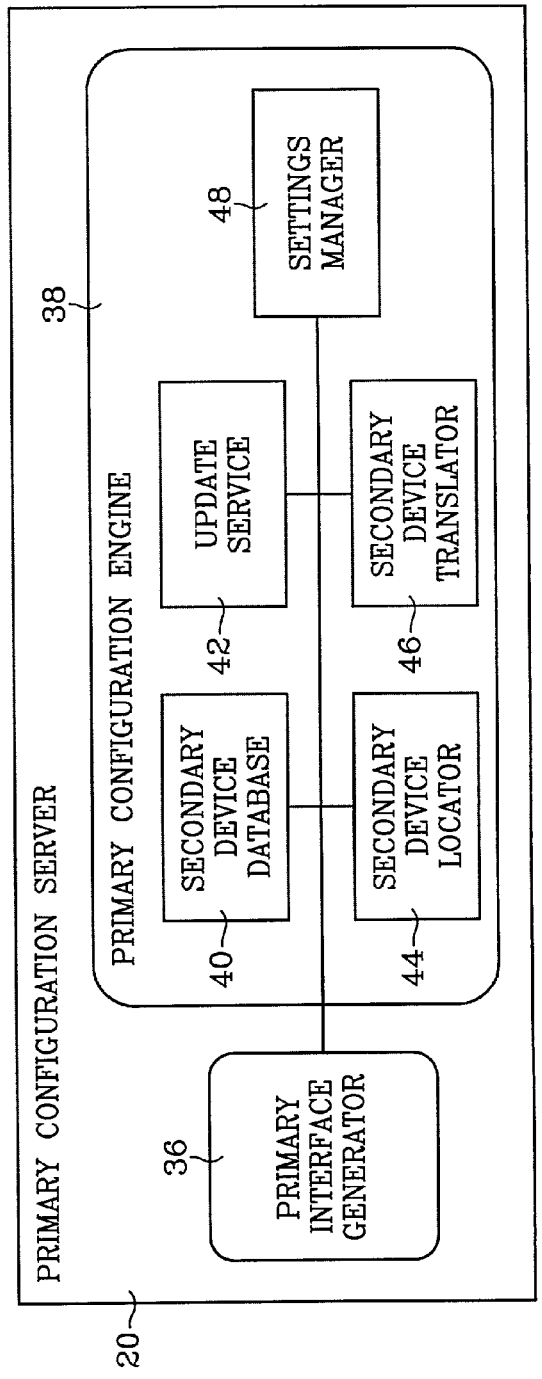
FIG. 4 is a block diagram further illustrating the logical components of the primary configuration server of FIG. 2.

Illustrated in FIG. 4, the logical components of primary configuration server 20 include primary interface generator 36 and primary configuration engine 38. Primary configuration engine 38 includes secondary device database 40, update service 42, secondary device locator 44, secondary device translator 46, and settings manager 48. Secondary device database 40 stores the network addresses for secondary devices 16. Secondary device locator 44, using SNMP (Simple Network Management Protocol) for example, communicates over network 10 and identifies the network address or other identifier of each secondary devices 16. Update service 42 updates secondary device database 40 with network addresses identified by secondary device locator 44 and not already contained in database 40.

With the network address for each secondary device, secondary device translator 46, using TCP/IP (Transmission Control Protocol/Internet Protocol) for example, establishes a communications link with each secondary configuration server 22. Where secondary configuration servers 22 are web servers, translator 46, functioning as a web browser, requests the web page for each secondary device 16. Alternatively, secondary device translator 46 may use PML (Peripheral Management Language) to retrieve configuration logic from secondary configuration servers 22. PML is a transaction oriented protocol which is designed to support asynchronous peripheral control and monitoring capabilities using an object-centered request-reply mechanism.

Primary interface generator 36 compiles the configuration logic gathered from secondary configuration servers 22 with the configuration logic for the primary device and generates a common user interface for configuring primary and secondary devices 14 and 16. Where servers 20 and 22 are web servers, primary interface generator 36 parses the web page of each secondary device and produces a primary web page containing user accessible controls for selecting and returning configuration settings for primary and secondary devices 14 and 16. Secondary device translator 46 is also responsible for returning to each secondary configuration server 22 those configuration settings selected for secondary devices 16. Settings manager 48 is responsible for applying those configuration settings selected for primary device 14.

The block diagrams of FIGS. 1-6 show the architecture, functionality, and operation of an implementation of the device configuration system. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

While it is envisioned that primary configuration server 20 will be embedded in or otherwise operating on primary device 14, primary configuration server 20 need only be capable of communicating with primary device 14 over network 10. Similarly, secondary configuration servers 22 need only be capable of communicating with secondary devices over network 10. In fact, one secondary configuration server may be responsible for configuring more than one secondary device 16.

Also, the document production system can be embodied in any computer-readable medium for use by or in connection with an instruction execution system such as a computer/processor based system or other system that can fetch or obtain the logic from the computer-readable medium and execute the instructions contained therein. The computer readable medium can comprise any one of many physical media Examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

USE: The use of the invented device configuration system will now be described with reference to the flow diagrams FIGS. 5 and 6, the logical communication paths illustrated in FIGS. 7 and 8, and the exemplary screen view of FIG. 9. Beginning with FIG. 5, client device 12 sends a configuration request to primary configuration server 20 initiating a primary configuration session (step 60). In response primary configuration server 20 sends configuration requests to one or more of the secondary configuration servers 22 initiating one or more secondary configuration sessions (step 62). Secondary configuration servers 22 return configuration logic for each corresponding secondary device 16 allowing primary interface generator 36 to parse and compile that configuration logic with configuration logic for primary device 12, thus, generating a user interface returned to client device 12 (step 64). On display device 24, client 28 presents the user interface enabling a system administrator or other user to select and return configuration settings to be applied to primary and secondary network devices (step 66).

Figure 5:
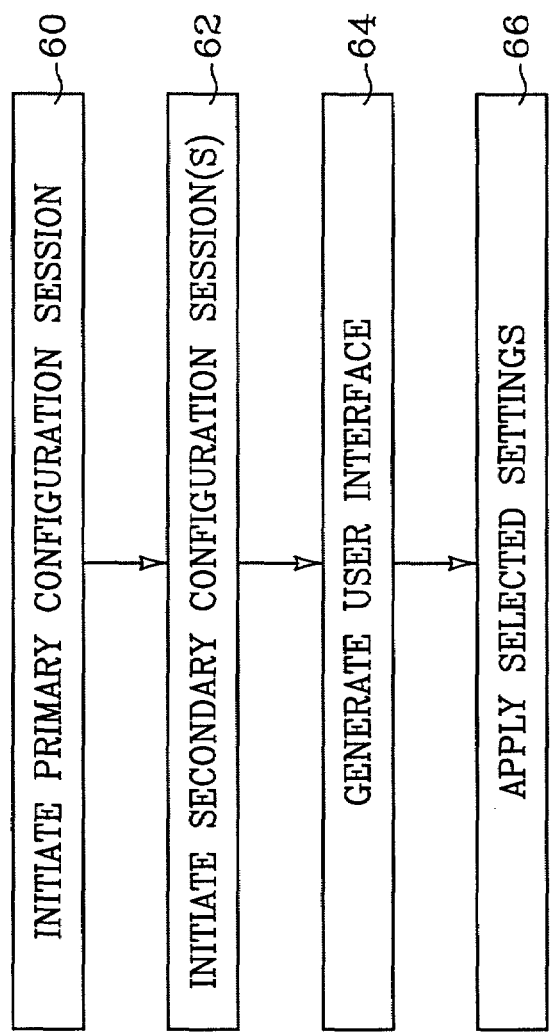
FIG. 5 is a flow diagram of one embodiment of the invented method.
Figure 6:
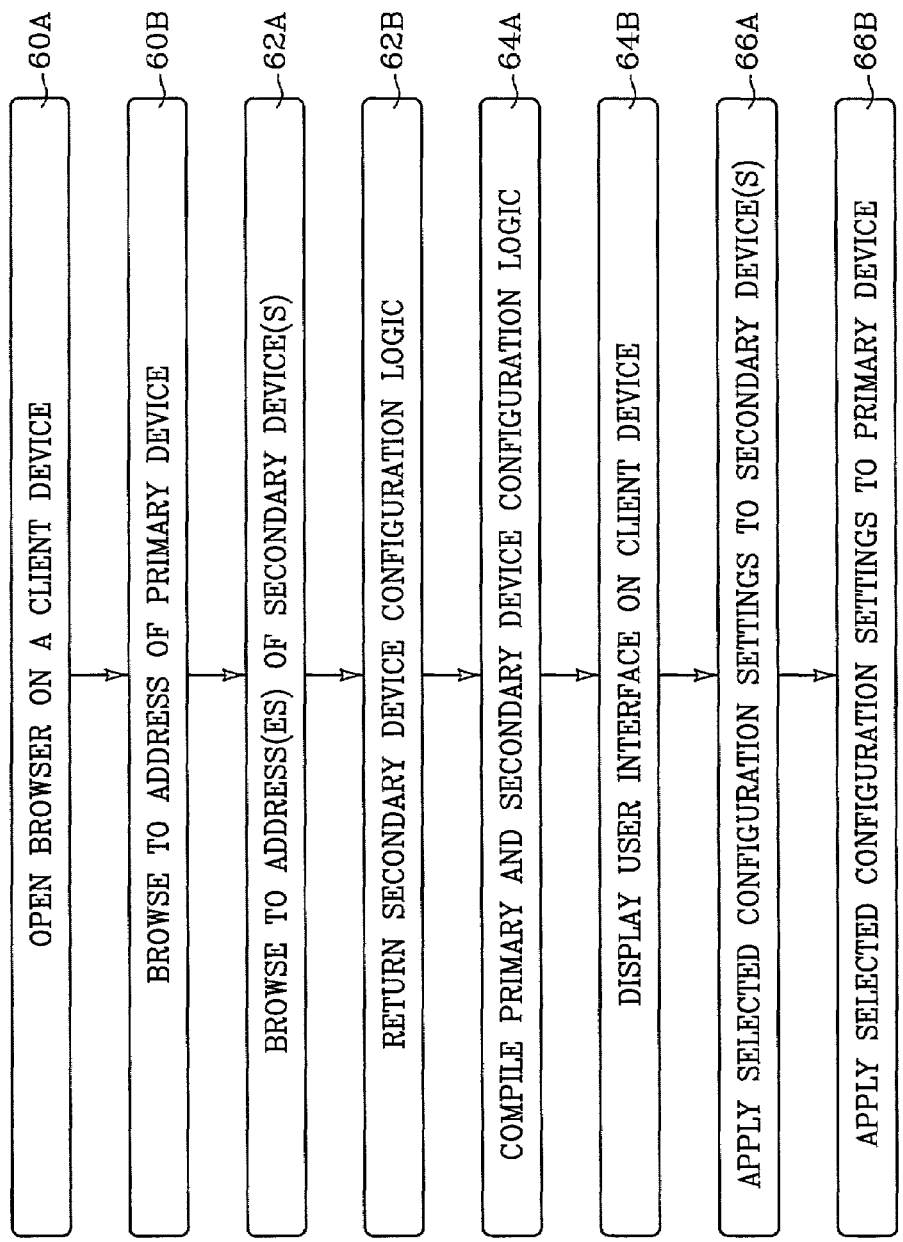
FIG. 6 is a flow diagram expanding upon the flow diagram of FIG. 7 in which web servers are embedded in the primary and secondary devices.

Referring now to FIG. 6, it is envisioned that the device configuration process described above will usually be initiated through a web browser functioning as client 28 on client device 12 while primary and secondary configuration servers 20 and 22 will function as web servers. In this embodiment, a primary configuration session is initiated (step 60 in FIG. 5) by opening the browser (step 60A) and entering the network address for primary configuration server 20 (step 60B). The network address may take the form of an IP (Internet Protocol) address, an URL (Uniform Resource Locator), or any other functional identifier. In response, primary configuration server 20, using secondary device translator 46, initiates secondary configuration sessions (step 62 in FIG. 5) by browsing to the network addresses of secondary configuration servers 22 (step 62A). These addresses may be selected from secondary device database 40 or obtained directly from secondary devices 16 using secondary device locator 46. Alternatively, primary configuration server 20 may generate a user interface having user accessible controls allowing a user to enter and return network addresses for selected secondary configuration servers. Each secondary configuration server 22 then returns configuration logic in the form of a web page corresponding to a particular secondary device 16 (step 62B).

Primary configuration engine 38, then, generates a user interface (step 64 of FIG. 5) by compiling the configuration logic returned in the web pages for secondary devices 16 with configuration logic for primary device 14 (step 64A). The compiled configuration logic is placed in a primary web page displayed by the web browser 28 on client device 12 (step 64B). The primary web page contains user accessible controls for selecting and returning configuration settings for primary and secondary devices 14 and 16.

Preferably, one or more selected settings can be applied to two or more primary and/or secondary network devices. For example, a number of network devices 14 and 16 may share configuration settings for attributes such as subnet mask, device password, and system contact. Consequently, it would be inefficient to require a user to repeatedly enter the same setting for multiple devices. Even when providing attributes settings unique to each device, it is still not convenient to browse to each device independently. U.S. patent application Ser. No. 09/550,540 entitled "Dynamic User Interface for Device Management Applications" filed on Apr. 14, 2000 discloses a method for generating a user interface for selecting and returning a single configuration setting to be applied across a two or more network devices. The 550540 application also discloses methods for displaying controls for selecting and returning configuration settings unique to each network device. The 550540 application is hereby incorporated by reference.

With the web browser displaying the primary web page on client device 12, the user selects desired configuration settings for each network device. The web browser returns the selected settings to primary server 20. Secondary device translator 46 returns selected secondary device configuration settings to be applied by each corresponding secondary configuration server 22 (step 66A). Settings manager 48 then applies those configuration settings selected for primary device 14 (step 66B).

Figure 7:
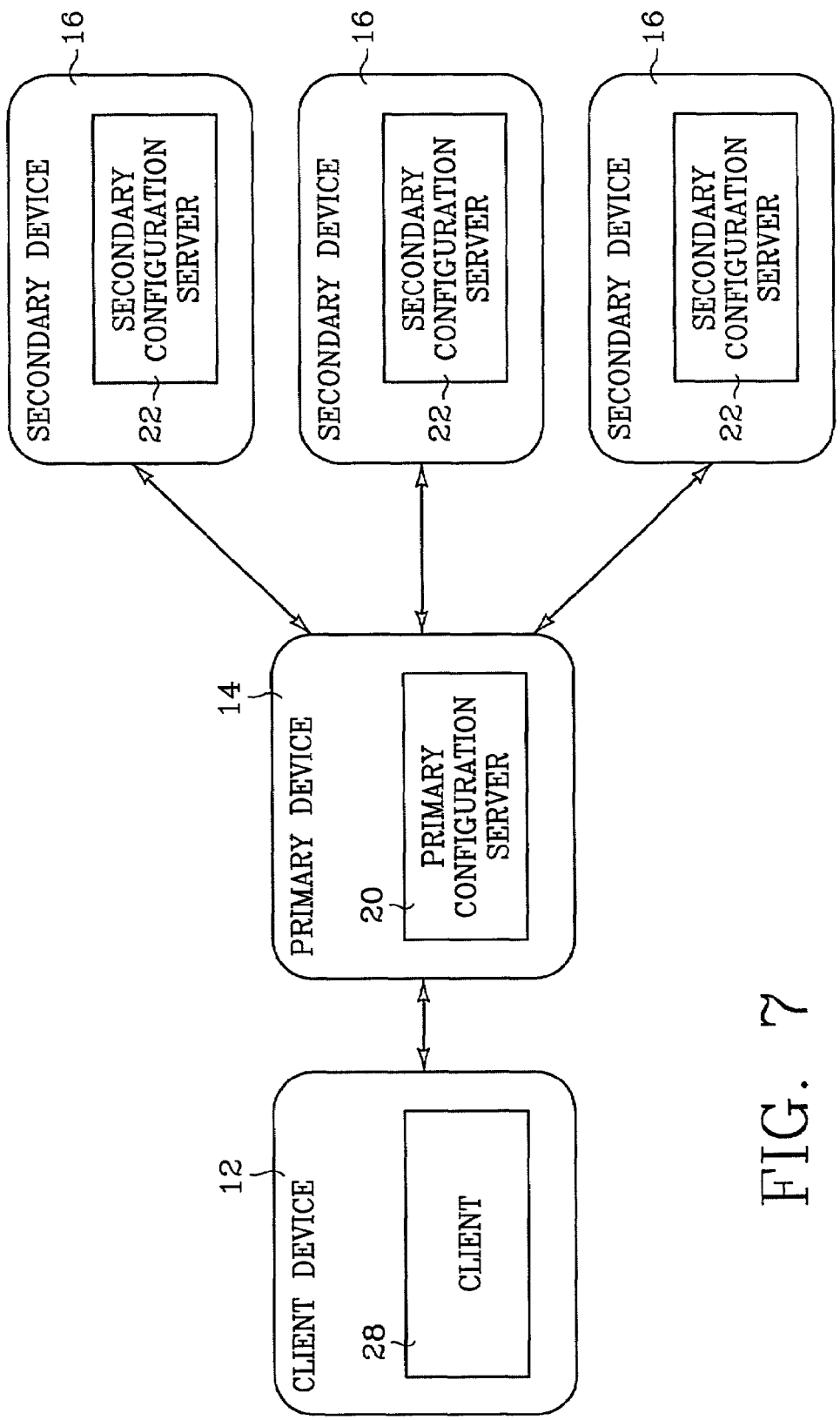
FIG. 7 is a block diagram illustrating one possible communications path between the client, primary, and secondary devices.
Figure 8:
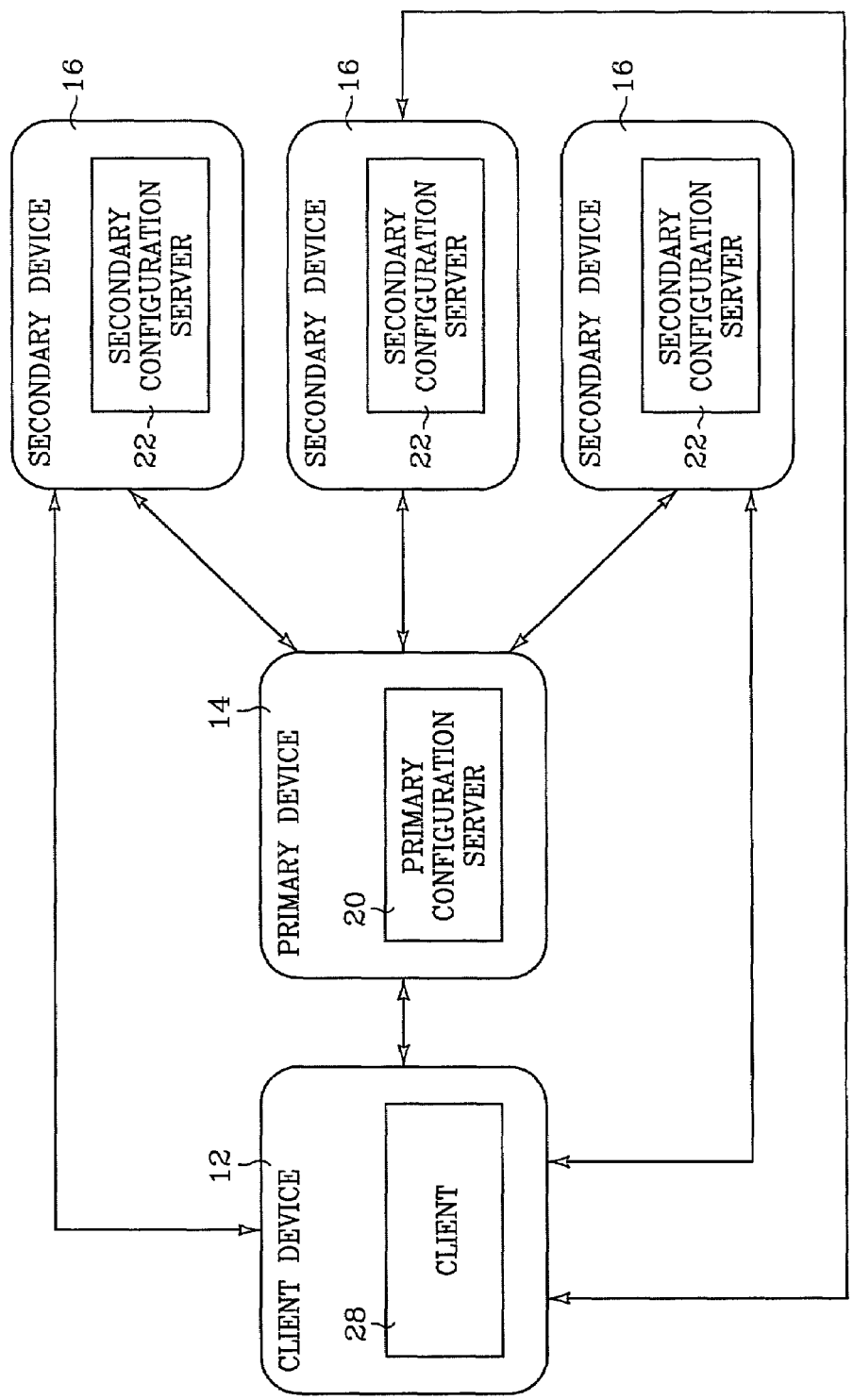
FIG. 8 is a block diagram illustrating a second possible communications path between the client, primary, and secondary devices.

In the example described with reference to FIG. 6, primary configuration server 20 acts as a proxy facilitating all communication between client device 12 and secondary devices 16—the logical communications path for which is illustrated in FIG. 7. Alternatively, upon initiation of a primary configuration session (step 60 in FIG. 5), primary interface generator 36 may produce and return a framed web page to the browser on client device 12. A framed web page is one that divides the browser's display area into two or more sections or frames. The actual content of each frame are not provided by the framed web page itself. Rather, the framed web page provides, for each frame, a network address for accessing a specified web page to be displayed in that frame. The logical communications path for this embodiment is illustrated in FIG. 8. Primary configuration server 20 obtains the network addresses for secondary devices 16 from secondary device database 40 or directly from secondary devices 16 using secondary device locator 46. Primary interface generator 36 then creates a framed web page using the network address for primary and each secondary network device 14 and 16 producing a single user interface for configuring network devices 14 and 16. Each frame displays user accessible controls for selecting and directly returning configuration settings to a particular network device 14 or 16.

Figure 9:
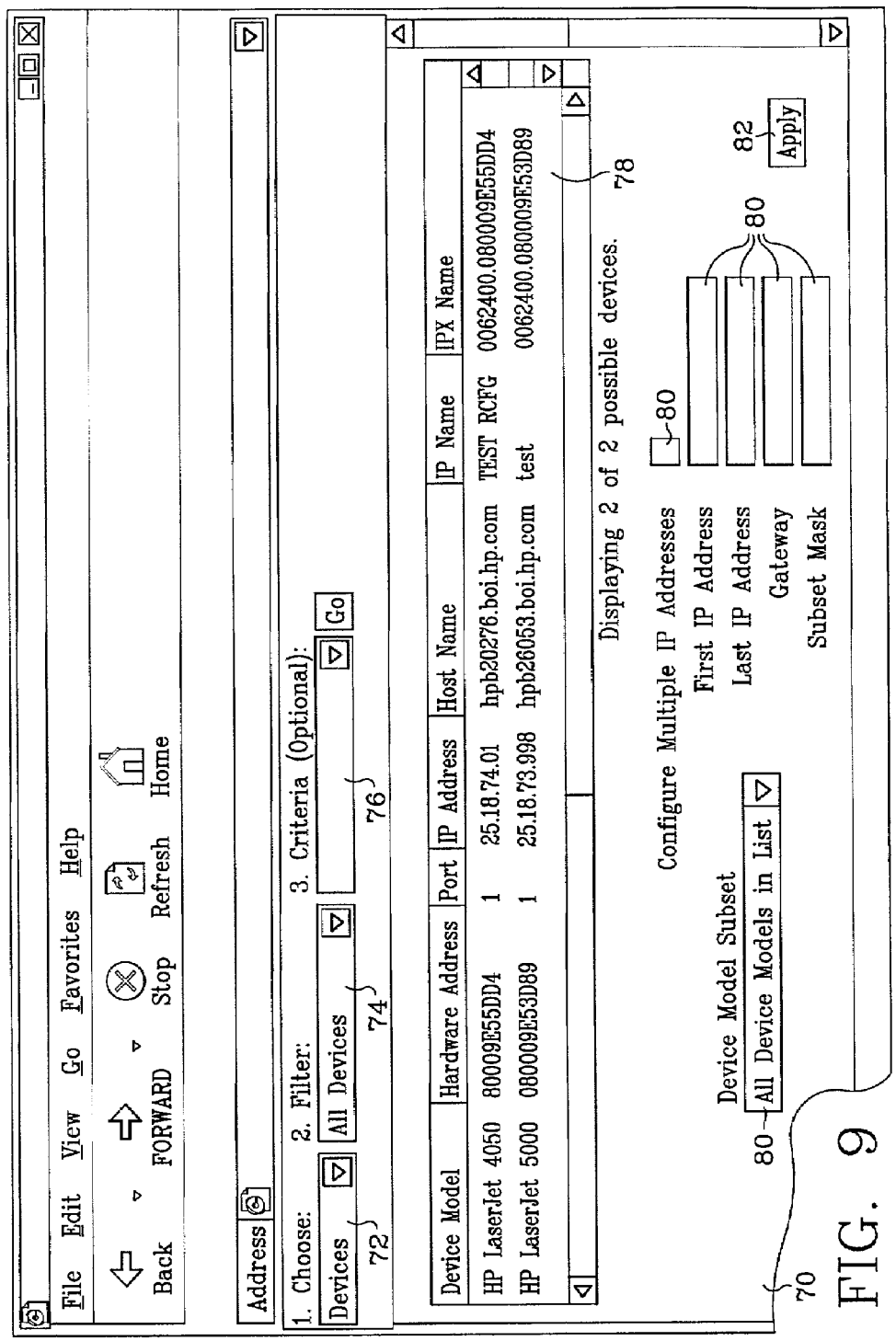
FIG. 9 is an exemplary screen display illustrating a user interface according to one embodiment of the present invention.

FIG. 9 illustrates an example of a user interface 70 generated in step 64. User interface 70 is displayed using client 28, in this case a web browser, on client device 12. Using pull down menus 72, 74, and 76, the user selects the device or devices to be configured. Text Box 78 displays the devices matching the selected criteria. Controls 80 allow the user to enter configuration settings for the devices listed in text box 78. When finished, the user selects button 82 to apply the selected settings to the devices in box 78.

Although the flow charts of FIGS. 5 and 6 each show a specific order of execution, the order of execution may differ from that which is depicted. For example, the order of execution of two or more blocks may be scrambled relative to the order shown. Also, two or more blocks shown in succession in FIG. 5 or 6 may be executed concurrently or with partial concurrence. All such variations are within the scope of the present invention. Moreover, the screen display of FIG. 9 is exemplary only. There exist many possible layout and control configurations for a user interface that will allow a user to select and return configuration settings. FIG. 9 merely provides one example.

The present invention has been shown and described with reference to the foregoing exemplary embodiments. It is to be understood, however that other forms, details, and embodiments may be made without departing from the spirit and scope of the invention which is defined in the following claims.

What is claimed is:

1. A method for configuring devices on a computer network, comprising:
   initiating a configuration session for a primary device;
   the primary device collecting configuration logic for the primary device and one or more secondary devices, the configuration logic for each device including information for generating a user interface for configuring that device;
   generating, according to the collected configuration logic, a user interface having user accessible controls for selecting and returning configuration settings for the primary and secondary devices; and
   returning each selected configuration setting to be applied to the primary or secondary device for which it was selected.

2. The method of claim 1, wherein the act of collecting includes collecting configuration logic from one or more web servers, each web server embedded in a secondary device, and the act of generating includes generating a user interface to be displayed on a web browser.

3. The method of claim 1, wherein the act of collecting includes identifying the network address of one or more secondary devices and establishing a communication link between the primary device and one or more secondary devices using the identified network address of each secondary device.

4. The method of claim 3, wherein the act of identifying includes generating a user interface having user accessible controls for selecting and returning a network address for one or more secondary devices.

5. The method of claim 3, wherein the act of identifying includes discovering secondary devices present on the network, and obtaining the network address for each discovered secondary device.

6. The method of claim 1, wherein the act of generating includes generating a user interface having user accessible controls for applying a configuration selling across a plurality of primary and/or secondary devices and user accessible controls for applying a selected configuration setting to a single primary or secondary device.

7. A method for configuring network devices, comprising:
   initiating a primary configuration session on a primary configuration server administering the configuration of a primary device;
   the primary configuration server initiating a secondary configuration session on a secondary configuration server administering the configuration of a secondary device;
   the primary configuration server collecting configuration logic for the primary device and the secondary device, the configuration logic for each device including information for generating a user interface for configuring that device;

the primary configuration server generating, according to the collected configuration logic, a user interface having user accessible controls for selecting and returning configuration settings for the primary and secondary devices; and returning each selected configuration setting the primary or secondary device for which it was selected.

8. The method of claim 7, wherein the primary configuration server is a primary web server, and the act of initiating a primary configuration session includes browsing to the primary web server, and wherein each secondary configuration server is a secondary web server, and the act of initiating a secondary configuration session includes the primary web server browsing to one or more of the secondary web servers.

9. The method of claim 7, wherein the act of initiating a secondary configuration session includes initiating a secondary configuration session on a plurality of secondary configuration servers, each secondary configuration server administering the configuration of a different secondary device, and wherein the act of generating includes the primary configuration server generating a user interface having user accessible controls for selecting and returning configuration settings for the primary and plurality of secondary devices.

10. The method of claim 7, wherein the act of generating includes generating a user interface having user accessible controls for applying a configuration setting across a plurality of primary and/or secondary devices and user accessible controls for applying a selected configuration setting to a single primary or secondary device.

11. A computer program product for configuring network devices, the product comprising a computer useable medium having computer readable instructions thereon for:

initiating a primary configuration session for a primary device;

from the primary device, initiating a secondary configuration session for a secondary device;

from the primary device, collecting configuration logic for the primary device and the secondary device, the configuration logic for each device including information for generating a user interface for configuring that device; and generating, according to the collected configuration logic, a user interface having user accessible controls for selecting configuration settings for the primary and secondary devices.

12. The product of claim 11, wherein the instructions for initiating a primary configuration session comprise instructions for initiating a configuration session upon request from a client.

13. The product of claim 11, wherein the instructions for generating include instructions for generating a user interface on a client device.

14. The product of claim 11, wherein the instruction for initiating a secondary configuration session comprise instructions for initiating a plurality of secondary configuration sessions, each secondary configuration session being initiated for a different secondary device.

15. The product of claim 11, wherein the instructions for initiating a primary configuration session comprise instructions for accessing a primary web server administering the configuration for the primary device and wherein the instructions for initiating the secondary configuration session comprise instructions for directing the primary web server to access a secondary web server administering the configuration of the secondary device.

16. The product of claim 11, wherein the instructions for generating comprise instructions for generating a user interface having user accessible controls for applying a configuration selling across a plurality of network devices and for having user accessible controls for applying a configuration selling to a selected network device.

17. A system for configuring network devices, comprising:

a primary configuration engine operating on a primary device, the configuration engine operable to collect configuration logic for the primary and one or more secondary devices, the configuration logic for each device including information for generating a user interface for configuring that device; and a primary interface generator in electronic communication with the configuration engine, the interface generator operative to generate, according to configuration logic collected by the primary configuration engine, a user interface having user accessible controls for selecting and returning configuration settings for the primary and secondary devices.

18. The system of claim 17, wherein the primary configuration engine includes a secondary device locator.

19. The system of claim 17, wherein the primary configuration engine includes a secondary device database containing the logical network address of one or more secondary devices.

20. The system of claim 19, wherein the primary configuration engine further includes a secondary device locator and an update service, the device locator operable to identify the logical network address of secondary devices and the update service operable to update the secondary device database with the logical address of each secondary device not already contained in the secondary device database.

21. The system of claim 17, wherein the primary interface generator is a web server embedded in the primary device and the interface generator is operable to generate a user interface to be displayed using a web browser.

22. The system of claim 17, wherein the primary interface generator is operable to generate a user interface having user accessible controls for selecting and returning a configuration setting to be applied across a plurality of network devices and having user accessible controls for selecting and returning a configuration setting to be applied to a selected network device.

23. A system for configuring network devices, comprising:

a secondary configuration server operable to manage one or more configuration settings of a secondary device; and a primary configuration server in electronic communication with the secondary configuration server, the primary configuration server operable to manage one or more configuration settings of a primary device, to collect configuration logic for the primary and secondary devices; and to generate, according to configuration logic collected by the primary configuration engine, a user interface having user accessible controls for selecting and returning configuration settings for the primary and secondary devices.

24. The system of claim 23, comprising a plurality of secondary configuration servers each operable to manage one or more configuration settings of a secondary device, wherein the primary configuration server is in electronic communication with each secondary configuration server and is operable to generate a user interface having user accessible controls for selecting and returning configuration settings for the primary and each secondary device.

25. The system of claim 23, further comprising a client in electronic communication with the primary configuration server, the client operable to display the user interface and to return selected settings.

26. The system of claim 23, wherein the client is operating on a client device different from the primary and secondary devices.

27. The system of claim 25, wherein the primary configuration server is operable to receive each of the selected configuration settings from the client and to forward the selected configuration settings for the secondary device to the secondary configuration server.

28. The system of claim 25, wherein the secondary configuration server is a web server embedded in the secondary device, the primary configuration server is a primary web server embedded in the primary device, and the client is a web browser.

29. The system of claim 28, wherein:

the secondary web server comprises a secondary interface generator for providing configuration logic for the secondary device and a secondary configuration engine for administering configuration settings for the secondary device; and the primary web server comprises a primary configuration engine for administering the configuration settings of the primary device and for facilitating communication with the secondary web server, and a primary interface generator for compiling the configuration logic for the secondary device with configuration logic for the primary device into a web page to be displayed by client.

30. The system of claim 29, wherein the primary configuration engine includes a secondary device locator.

31. The system of claim 29, wherein the primary configuration engine includes a secondary device database containing the network address of one or more secondary devices.

32. The system of claim 31, wherein the primary configuration engine further includes an update service, the device locator operable to identify the logical network address of secondary devices and the update service operable to update the secondary device database with the logical address of each secondary device not already contained in the secondary device database.

33. The system of claim 23, wherein the user interface includes user selectable controls applying a single setting across multiple primary and/or secondary devices and user accessible controls for applying a configuration setting to a specified primary or secondary device.

* * * * *

UNITED STATES PATENT AND TRADEMARK OFFICE
CERTIFICATE OF CORRECTION

PATENT NO. : 7,698,389 B2
APPLICATION NO. : 09/859856
DATED : April 13, 2010
INVENTOR(S) : Robert Sesek et al.

It is certified that error appears in the above-identified patent and that said Letters Patent is hereby corrected as shown below:

In column 8, line 53, in Claim 6, delete "selling" and insert -- setting --, therefor.

In column 10, line 7, in Claim 16, delete "selling" and insert -- setting --, therefor.

In column 10, line 9, in Claim 16, delete "selling" and insert -- setting --, therefor.

Signed and Sealed this

Thirty-first Day of August, 2010

David J. Kappos
*Director of the United States Patent and Trademark Office*